United States Patent
Ke

(10) Patent No.: US 10,120,639 B2
(45) Date of Patent: Nov. 6, 2018

(54) MULTIMEDIA PLAYING APPLICATION CONTROL METHOD AND TERMINAL

(71) Applicant: Huawei Technologies Co., Ltd., Shenzhen, Guangdong (CN)

(72) Inventor: Yuandan Ke, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/323,681

(22) PCT Filed: Jul. 4, 2014

(86) PCT No.: PCT/CN2014/081675
§ 371 (c)(1),
(2) Date: Jan. 3, 2017

(87) PCT Pub. No.: WO2016/000263
PCT Pub. Date: Jan. 7, 2016

(65) Prior Publication Data
US 2017/0161012 A1   Jun. 8, 2017

(51) Int. Cl.
*G06F 17/00* (2006.01)
*G06F 3/16* (2006.01)
*G06F 3/041* (2006.01)

(52) U.S. Cl.
CPC .............. *G06F 3/165* (2013.01); *G06F 3/041* (2013.01)

(58) Field of Classification Search
CPC .................................. G06F 3/165; G06F 3/041
See application file for complete search history.

(56) References Cited

U.S. PATENT DOCUMENTS

| 8,478,855 | B1 | 7/2013 | Evans |
| 2004/0142656 | A1 | 7/2004 | Bensimon et al. |
| 2007/0074619 | A1* | 4/2007 | Vergo ........................ G10H 1/42 84/612 |
| 2008/0051919 | A1* | 2/2008 | Sakai ....................... A63B 71/00 700/94 |
| 2009/0024233 | A1* | 1/2009 | Shirai ................ A63B 71/0686 700/94 |
| 2009/0144080 | A1* | 6/2009 | Gray ................... G06F 19/3481 705/2 |
| 2010/0070574 | A1 | 3/2010 | Li |

(Continued)

FOREIGN PATENT DOCUMENTS

| CN | 1599293 A | 3/2005 |
| CN | 101072381 A | 11/2007 |
| CN | 101441882 A | 5/2009 |

(Continued)

*Primary Examiner* — Andrew C Flanders

(57) ABSTRACT

A multimedia playing application control method and a terminal. A terminal receives physical indication information, where the physical indication information is used to control a multimedia playing application running in the terminal. The terminal converts the physical indication information into corresponding control indication information according to a preset correspondence. The terminal sends the control indication information to the multimedia playing application running in the terminal, where the control indication information is used to instruct the multimedia playing application to execute an operation corresponding to the control indication information.

3 Claims, 5 Drawing Sheets

(56) References Cited

U.S. PATENT DOCUMENTS

2011/0047134 A1    2/2011   Zhang et al.

FOREIGN PATENT DOCUMENTS

| CN | 101498973 A | 8/2009 |
| CN | 101572796 A | 11/2009 |
| CN | 101583017 A | 11/2009 |
| CN | 101668180 A | 3/2010 |
| CN | 102799297 A | 11/2012 |
| EP | 2094021 A1 | 8/2009 |
| EP | 2273785 A1 | 1/2011 |

* cited by examiner

MULTIMEDIA PLAYING APPLICATION CONTROL METHOD AND TERMINAL

CROSS REFERENCE TO RELATED APPLICATIONS

The present application claims priority under 35 U.S.C. § 365 to International Patent Application No. PCT/CN2014/081675 filed Jul. 4, 2014 which is incorporated herein by reference into the present disclosure as if fully set forth herein.

TECHNICAL FIELD

The present invention relates to the field of multimedia processing technologies, and in particular, to a multimedia playing application control method and a terminal.

BACKGROUND

With rapid development of network communications technologies, terminals gain fast-growing popularity, and have become indispensable tools in daily life of people. An existing terminal already has a powerful processing capability and is turning from a simple communication tool into a comprehensive information processing platform.

Multimedia playing is an important aspect in extending terminal functions. Richness and high-speed propagation of network multimedia resources facilitate using a terminal to play a multimedia file. A user can use multimedia playing software in a terminal to play music or a video that the user likes when waiting for bus or in other spare time.

Currently, when a multimedia file is played by using a terminal, some multimedia playing functions can be quickly and conveniently controlled by using a side key, an external wire control earphone, or a Bluetooth earphone of the terminal, for example, controlling a volume, playing a previous song, or playing a next song.

After detecting physical indication information sent by a wire control earphone or a Bluetooth earphone, a terminal sends the physical indication information to a multimedia playing application, and the multimedia playing application converts the physical indication information into control indication information. Because the conversion from the physical indication information into the control indication information is executed by the multimedia playing application, correspondences between control indication information and physical indication information that are defined by different multimedia playing applications may be different. For example, two audio playing applications are installed in a terminal: an audio playing application 1 and an audio playing application 2. For the audio playing application 1, pressing a volume key of an earphone twice indicates switching to a next piece of music. For the audio playing application 2, pressing the volume key of the earphone three times indicates switching to a next piece of music. Therefore, when a same type of control is performed on different multimedia playing applications, different physical indications may need to be executed. Therefore, disadvantages of poor flexibility and user experience exist in a current solution for controlling a multimedia playing application.

SUMMARY

Embodiments of the present invention provide a multimedia playing application control method and a terminal, to resolve problems of poor flexibility and user experience that exist when a multimedia playing application is controlled.

According to a first aspect, a multimedia playing application control method is provided, including:

receiving, by a terminal, physical indication information, where the physical indication information is used to control a multimedia playing application running in the terminal;

converting, by the terminal, the physical indication information into corresponding control indication information according to a preset correspondence; and sending, by the terminal, the control indication information to the multimedia playing application running in the terminal, where the control indication information is used to instruct the multimedia playing application to execute an operation corresponding to the control indication information.

With reference to the first aspect, in a first possible implementation manner, the receiving, by a terminal, physical indication information specifically includes:

receiving, by the terminal, a physical indication sent by an input device located in the terminal; or receiving, by the terminal, the physical indication information sent by an external device connected to the terminal; or receiving, by the terminal, voice information from the outside, where the physical indication information is the voice information used to control the multimedia playing application running in the terminal.

With reference to the first aspect, or the first possible implementation manner of the first aspect, in a second possible implementation manner, the sending, by the terminal, the control indication information to the multimedia playing application running in the terminal specifically includes:

determining, by the terminal, a multimedia playing application to be controlled by the physical indication information;

acquiring, by the terminal, a preset identifier corresponding to the to-be-controlled multimedia playing application; and broadcasting, by the terminal, a control message carrying the preset identifier and the control indication information, so that the to-be-controlled multimedia playing application receives and executes the control indication information.

With reference to the second possible implementation manner of the first aspect, in a third possible implementation manner, before the acquiring, by the terminal, a preset identifier corresponding to the to-be-controlled multimedia playing application, the method further includes:

sending, by the terminal, a query message to all multimedia playing applications installed in the terminal, where the query message is used to query for a preset value corresponding to each multimedia playing application;

receiving, by the terminal, the corresponding preset values that are separately returned by all the multimedia playing applications according to the query message;

using, by the terminal, the preset values as preset identifiers, or generating, by the terminal, preset identifiers according to the preset values; and storing, by the terminal, the preset identifiers corresponding to the multimedia playing applications.

With reference to the third possible implementation manner of the first aspect, in a fourth possible implementation manner, the acquiring, by the terminal, a preset identifier corresponding to the to-be-controlled multimedia playing application specifically includes:

acquiring, by the terminal, the preset identifier corresponding to the to-be-controlled multimedia playing application from the stored preset identifiers corresponding to the multimedia playing applications.

With reference to the first aspect or any one of the first to the fourth possible implementation manners of the first aspect, in a fifth possible implementation manner, after the sending, by the terminal, the control indication information to the multimedia playing application running in the terminal, the method further includes:

receiving, by the terminal, a feedback message sent by the multimedia playing application, where the feedback message is used to show a result of execution of the control indication information by the multimedia playing application.

With reference to the fifth possible implementation manner of the first aspect, in a sixth possible implementation manner, after the acquiring, by the terminal, a preset identifier corresponding to the to-be-controlled multimedia playing application, the method further includes:

displaying, by the terminal, the feedback message in a text form, a voice form, or a vibration form on the terminal; or sending, by the terminal, the feedback message to the external device, so that the external device displays the feedback message in a text form, a voice form, or a vibration form on the external device.

With reference to any one of the third to the sixth possible implementation manners of the first aspect, in a seventh possible implementation manner, the preset values are package names of the multimedia playing applications; and the generating, by the terminal, preset identifiers according to the preset values specifically includes:

using, by the terminal, the package names of the multimedia playing applications and a preset character string as the preset identifiers.

According to a second aspect, a terminal is provided, including:

a receiving unit, configured to receive physical indication information, where the physical indication information is used to control a multimedia playing application running in the terminal;

a conversion unit, configured to convert the physical indication information into corresponding control indication information according to a preset correspondence; and a sending unit, configured to send the control indication information to the multimedia playing application running in the terminal, where the control indication information is used to instruct the multimedia playing application to execute an operation corresponding to the control indication information.

With reference to the second aspect, in a first possible implementation manner, the receiving unit is specifically configured to:

receive a physical indication sent by an input device located in the terminal; or receive the physical indication information sent by an external device connected to the terminal; or receive voice information from the outside, where the physical indication information is the voice information used to control the multimedia playing application running in the terminal.

With reference to the second aspect or the first possible implementation manner of the second aspect, in a second possible implementation manner, the sending unit is specifically configured to:

determine a multimedia playing application to be controlled by the physical indication information;

acquire a preset identifier corresponding to the to-be-controlled multimedia playing application; and broadcast a control message carrying the preset identifier and the control indication information, so that the to-be-controlled multimedia playing application receives and executes the control indication information.

With reference to the second possible implementation manner of the second aspect, in a third possible implementation manner, the sending unit is further configured to: before acquiring the preset identifier corresponding to the to-be-controlled multimedia playing application, send a query message to all multimedia playing applications installed in the terminal, where the query message is used to query for a preset value corresponding to each multimedia playing application;

the receiving unit is further configured to receive the corresponding preset values that are separately returned by all the multimedia playing applications according to the query message; and the terminal further includes a generation unit and a storage unit, where the generation unit is configured to use the preset values as preset identifiers, or generate preset identifiers according to the preset values; and the storage unit is configured to store mapping relationships between identifiers of the multimedia playing applications and the corresponding preset identifiers.

With reference to the third possible implementation manner of the second aspect, in a fourth possible implementation manner, when acquiring the preset identifier corresponding to the to-be-controlled multimedia playing application, the sending unit is specifically configured to:

acquire the preset identifier corresponding to the to-be-controlled multimedia playing application from the stored preset identifiers corresponding to the identifiers of the multimedia playing applications.

With reference to the second aspect or any one of the first to the fourth possible implementation manners of the second aspect, in a fifth possible implementation manner, the receiving unit is further configured to:

after the sending unit sends the control indication information to the multimedia playing application running in the terminal, receive a feedback message sent by the multimedia playing application, where the feedback message is used to show a result of execution of the control indication information by the multimedia playing application.

With reference to the fifth possible implementation manner of the second aspect, in a sixth possible implementation manner, the apparatus further includes an output unit, and the output unit is specifically configured to:

after the receiving unit receives the feedback message sent by the multimedia playing application, display the feedback message in a text form, a voice form, or a vibration form on the terminal; or after the receiving unit receives the feedback message sent by the multimedia playing application, send the feedback message to the external device, so that the external device displays the feedback message in a text form, a voice form, or a vibration form on the external device.

With reference to any one of the third to the sixth possible implementation manners of the second aspect, in a seventh possible implementation manner, the preset values are package names of the multimedia playing applications; and the generating, by the generation unit, preset identifiers according to the preset values is specifically:

using the package names of the multimedia playing applications and a preset character string as the preset identifiers.

A beneficial effect of the present invention is as follows:

In the embodiments of the present invention, conversion from physical indication information into control indication information is executed by a terminal, and correspondences between control indication information and physical indication information that are defined by a same terminal are the same. Therefore, when a same type of control is performed on different multimedia playing applications, only a same physical indication needs to be executed. Therefore, disadvantages of poor flexibility and user experience that exist when a multimedia playing application is controlled are resolved.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the following, implementation manners of the present invention are described in detail with reference to the accompanying drawings. It should be understood that the embodiments described herein are merely used to illustrate and explain the present invention, but are not intended to limit the present invention. In addition, the embodiments of the present application and features in the embodiments may be mutually combined in a case in which they do not conflict with each other.

The following describes the implementation manners of the present invention in detail with reference to accompanying drawings.

Figure 1:
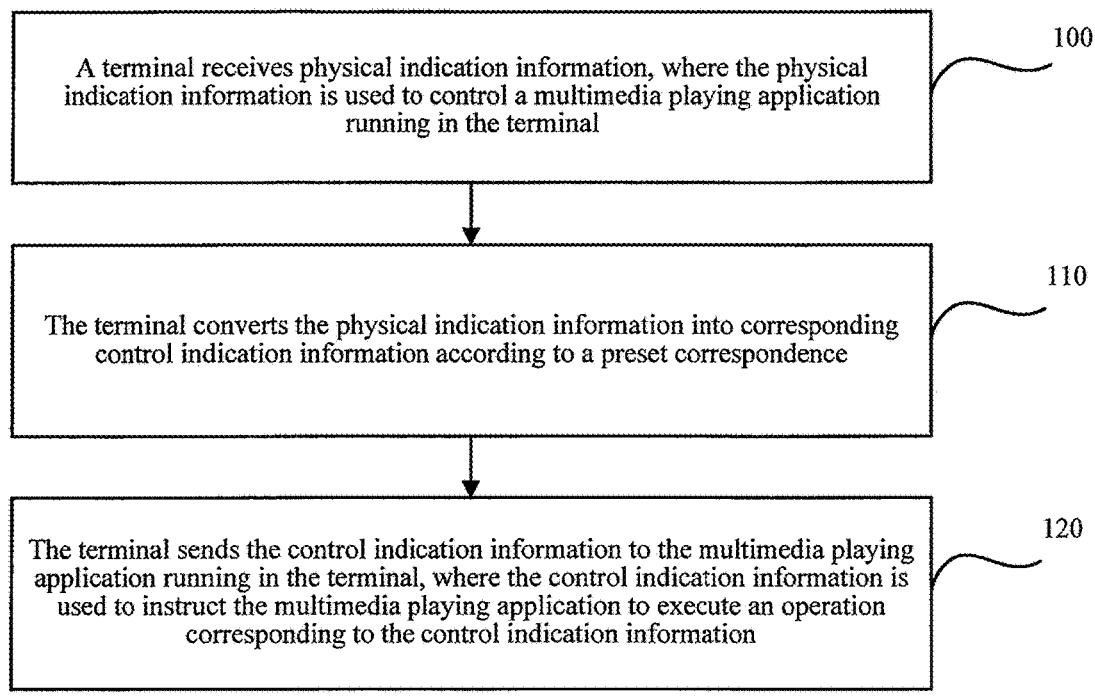
FIG. 1 is a flowchart of a multimedia playing application control method according to an embodiment of the present invention.

Referring to FIG. 1, in an embodiment of the present invention, a multimedia playing application control process is as follows:

Step 100: A terminal receives physical indication information, where the physical indication information is used to control a multimedia playing application running in the terminal.

In this embodiment of the present invention, there are multiple implementation manners for step 100, that is, a terminal receives physical indication information. Optionally, any one of the following manners may be used:

Manner 1: The terminal receives the physical indication information sent by an input device located in the terminal. The input device located in the terminal may be a physical key (for example, a volume key, a power key, or an input keyboard) on the terminal or a touchscreen of the terminal. When a user controls the input device of the terminal to perform a corresponding operation, for example, when the user presses the physical key once or multiple times or when the user taps the touchscreen for input, the terminal may receive corresponding physical indication information.

Manner 2: The terminal receives the physical indication information sent by an external device connected to the terminal. The connection between the external device and the terminal may be wireless or may be wired. The external device may be, for example, a wire control earphone, a Bluetooth earphone, a smart bracelet, and a smart watch, or certainly, may be another external device that can communicate with the terminal, which is not described in detail herein.

Manner 3: The terminal receives voice information from the outside, where the physical indication information is the voice information used to control the multimedia playing application running in the terminal. The physical indication information may further be voice control information sent by a user. When the user performs voice control on the terminal, the terminal may collect the voice information by using a microphone.

Certainly, the foregoing three manners are specific embodiments for implementing receiving the physical indication information by the terminal. During actual application, the present invention is not limited to the foregoing three manners, and there may be another implementation manner, which is not described in detail herein.

In this embodiment of the present invention, there are multiple types of physical indication information, for example, the physical indication information may be an operation indication of a volume key of an external earphone or a tap operation indication of a touchscreen of the terminal. Certainly, there is another form of physical indication information, which is not described in detail herein.

Step 110: The terminal converts the physical indication information into corresponding control indication information according to a preset correspondence.

The correspondence between the physical indication information and the control indication information may be preset. The terminal converts the physical indication information into the corresponding control indication information according to the preset correspondence. For example, the physical indication information is "a touchscreen of the terminal is tapped twice", and the corresponding control indication information may be "downloading a currently played multimedia file"; the physical indication information is "a volume-up key of a wire control earphone is pressed three times", and the corresponding control indication information is "adding a currently played multimedia file to favorites"; the physical indication information is "a volume-down key of the wire control earphone is pressed three times", and the corresponding control indication information is "sharing a currently played multimedia file"; or the physical indication information is "a volume-up key of the wire control earphone is pressed four times", and the corresponding control indication information is "deleting a currently played multimedia file".

The control indication information may be a specific operation indication or may be a preset value. For example, the terminal and the multimedia playing application agree in advance that value "1" represents "downloading the currently played multimedia file", and value "2" represents "adding the currently played multimedia file to the favorites", and the terminal may convert the acquired physical indication information into the value "1" or "2", and then send the value to the multimedia playing application.

Step 120: The terminal sends the control indication information to the multimedia playing application running in the terminal, where the control indication information is used to instruct the multimedia playing application to execute an operation corresponding to the control indication information.

In this embodiment of the present invention, there are multiple implementation processes for step 120, that is, there are multiple implementation manners for sending the control indication information by the terminal to the multimedia playing application running in the terminal. Optionally, the following two manners may be used:

manner 1: the terminal sends, in a manner of invoking a system interface sendBroadcast( ) function, the control indication information to the multimedia playing application running in the terminal; or manner 2: the terminal sends, in a manner of invoking a system interface sendBroadcastAsUser( ) function, the control indication information to the multimedia playing application running in the terminal.

Certainly, the foregoing manners are merely two specific examples of implementation. However, during actual application, the present invention is not limited to the two implementation manners, which are not described in detail herein again.

After receiving the control indication information sent by the terminal, the multimedia playing application executes a corresponding operation according to the control indication information. For example, when receiving the control indication information for playing a next song, the multimedia playing application switches to the next song to play the song.

As can be seen from the foregoing process, conversion from physical indication information into control indication information is executed by a terminal, and correspondences between control indication information and physical indication information that are defined by a same terminal are the same. Therefore, when a same type of control is performed on different multimedia playing applications, a user only needs to execute a same physical indication, and does not need to execute different physical indications for different multimedia playing applications. Therefore, disadvantages of poor flexibility and user experience that exist when a multimedia playing application is controlled are resolved.

Figure 2:
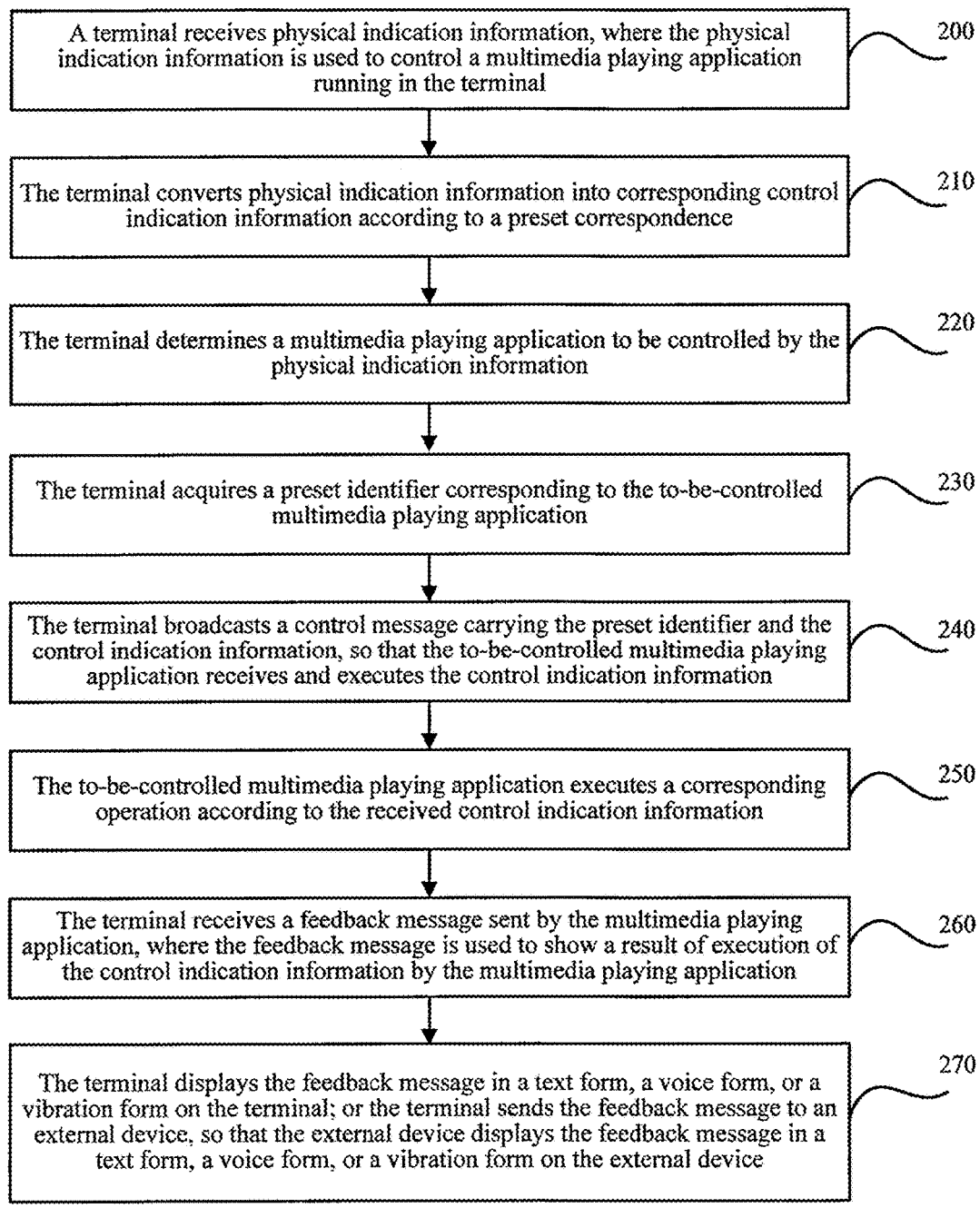
FIG. 2 is a flowchart of another multimedia playing application control method according to an embodiment of the present invention.

Referring to FIG. 2, which is a multimedia playing application control method according to another embodiment of the present invention, the method may include:

Step 200: A terminal receives physical indication information, where the physical indication information is used to control a multimedia playing application running in the terminal.

Step 210: The terminal converts the physical indication information into corresponding control indication information according to a preset correspondence.

For step 200 and step 210, respectively refer to descriptions in step 100 and step 110 in the embodiment shown in FIG. 1. Details are not described herein again.

Step 220: The terminal determines a multimedia playing application to be controlled by the physical indication information.

Specifically, The terminal may determine the multimedia playing application to be controlled by the physical indication information in the following manners:

The last multimedia playing application selected by a user is used as the to-be-controlled multimedia playing application, that is, the last multimedia playing application selected by the user is bound to the control indication information. In this manner, when receiving the physical indication information, the terminal determines that the multimedia playing application to be controlled by the control indication information, which is obtained after the physical indication information is converted, is the last multimedia playing application selected by the user.

The last multimedia playing application selected by the user may be a last multimedia playing application opened by the user, or may be a multimedia playing application tapped by the user in a list of currently running multimedia playing applications that are displayed in a screen of the terminal.

For example, three music playing applications currently run in the terminal: a music playing application 1, a music playing application 2, and a music playing application 3. A last opened music playing application is controlled by control indication information that is obtained after physical indication information of an external wire control earphone is converted. If the music playing application 2 is the last one that is opened among the music playing application 1, the music playing application 2, and the music playing application 3, after receiving the physical indication information of double clicking on a "volume-up key" sent by the external wire control earphone, the terminal sends a control indication "playing a previous song", which is obtained after the physical indication information is converted, to the music playing application 2, and the music playing application 2 plays the previous song according to the control indication information.

Step 230: The terminal acquires a preset identifier corresponding to the to-be-controlled multimedia playing application.

Step 240: The terminal broadcasts a control message carrying the preset identifier and the control indication information, so that the to-be-controlled multimedia playing application receives and executes the control indication information.

Step 250: The to-be-controlled multimedia playing application executes a corresponding operation according to the received control indication information.

In this embodiment of the present invention, before step 230, that is, the terminal acquires a preset identifier corresponding to the to-be-controlled multimedia playing application, is performed, the method may further include the following steps:

Step a1: The terminal sends a query message to all multimedia playing applications installed in the terminal, where the query message is used to query for a preset value corresponding to each multimedia playing application, where the preset values may be package names of the multimedia playing applications, the package names of the multimedia playing application are used to identify a corresponding multimedia playing application, and the package names in a same system are unique, that is, package names respectively corresponding to different multimedia playing applications are different.

Step b1: The terminal receives the corresponding preset values that are separately returned by all the multimedia playing applications according to the query message.

Step c1: The terminal uses the preset values as preset identifiers, or generates preset identifiers according to the preset values. The preset identifiers may only include the preset values, for example, the preset identifiers only include the package names of the multimedia playing applications; or the preset identifiers may include the preset values and a preset character string, for example, the preset identifiers includes the package names of the multimedia playing applications and a preset character string.

Step d1: The terminal stores the preset identifiers corresponding to identifiers of the multimedia playing applications.

That is, before acquiring the preset identifier corresponding to the to-be-controlled multimedia playing application, the terminal may first store the preset identifiers corresponding to all the multimedia playing applications installed in the terminal. Optionally, a list of mapping relationships between the identifiers of the multimedia playing applications and the preset identifiers may be stored in the terminal. The preset identifier corresponding to each multimedia playing application may be acquired by querying the list of mapping relationships.

For example, 20 application programs are installed in the terminal. First, the terminal needs to determine which application programs are multimedia playing applications. Assuming that ten application programs are multimedia playing applications, after the ten multimedia playing applications are determined, a query message is sent to each of the ten multimedia playing applications, and corresponding preset values separately returned by the ten multimedia playing applications are received. The terminal may directly use the preset values as preset identifiers, and further store mapping relationships between identifiers of the multimedia playing applications and the preset identifiers, or may store, after generating preset identifiers according to the preset values, a list of mapping relationships between identifiers of the multimedia playing applications and the generated preset identifiers.

In this embodiment of the present invention, when step a1, that is, the terminal sends a query message to all multimedia playing applications installed in the terminal, is performed, there are multiple implementation manners. Optionally, the following manner may be used, that is, step a1, for example, may be:

the terminal sends, in a manner of invoking a queryBroadcastReceiver( ) function, the query message to all the multimedia playing applications installed in the terminal.

In this embodiment of the present invention, when step b1, that is, the terminal receives the corresponding preset values that are separately returned by all the multimedia playing applications according to the query message, is performed, there are multiple implementation manners. Optionally, the following manner may be used, that is, step b1, for example, may be:

the terminal receives, in a manner of invoking the queryBroadcastReceiver( ) function, the corresponding preset values that are separately returned by all the multimedia playing applications according to the query message.

In this embodiment of the present invention, each multimedia playing application includes a corresponding preset identifier, and specifically, a program file of each multimedia playing application includes a corresponding preset identifier. The program file may be, for example, AndroidManifest.

For example, a form of the multimedia playing application is as follows:

```
<receiver
        android:name=" .RemoteControlReceiver" >
    <intent-filter>
        <action
android:name="android.intent.action.MEDIA_BUTTON" />
    </intent-filter>
</receiver>
```

When the corresponding preset identifier needs to be added to the multimedia playing application, a field (for example, an intent-filter field) may be added to the application, and the added intent-filter field is the preset identifier corresponding to the multimedia playing application. If the corresponding preset identifier is "imcs.action.MUSIC_CONTROL", a form of the multimedia playing application including the corresponding preset identifier is as follows:

```
<receiver
        android:name=" .RemoteControlReceiver" >
    <intent-filter>
        <action
android:name="android.intent.action.MEDIA_BUTTON" />
    </intent-filter>
    <intent-filter>
        <action       android:name       =
"com.doudou.fm.imcs.action.MUSIC_CONTROL" />
    </intent-filter>
</receiver>
```

In this embodiment of the present invention, step a1 to step d1 may be performed during execution of a multimedia playing application control process, for example, are performed after step 200 is performed and before step 220 is performed; or step a1 to step d1 may be a preprocessing process, and each time a multimedia playing application is installed in the terminal, the terminal may acquire a preset values corresponding to the multimedia playing applications by performing step a1 to step d1, and use the preset value as a preset identifier, or generate a preset identifier according to the preset value, and then store the preset identifier corresponding to the multimedia playing application.

In this embodiment of the present invention, if the preset identifiers corresponding to the multimedia playing applications are stored in the terminal, when step 230, that is, the terminal acquires a preset identifier corresponding to the to-be-controlled multimedia playing application, is performed, there are multiple manners. Optionally, the following manner may be used, that is, step 230, for example, may be:

the terminal acquires the preset identifier corresponding to the to-be-controlled multimedia playing application from the stored preset identifiers corresponding to the multimedia playing applications.

Certainly, when the preset identifiers are stored, the mapping relationships between the identifiers of the multimedia playing applications and the preset identifiers may also be stored.

For example, the mapping relationships between the identifiers of audio playing applications and the preset identifiers are shown in Table 1. When the terminal determines that a to-be-controlled audio playing application is "Baidu music playing application", the preset identifier is a preset identifier 1. Then, when sending the control indication information to the "Baidu music playing application", the terminal sends the preset identifier 1 by adding the preset identifier 1 to the control indication information. In this manner, only the "Baidu music playing application" can execute the control indication information.

TABLE 1

Mapping relationships between identifiers of audio playing applications and preset identifiers

| Identifiers of multimedia playing applications | Preset identifiers |
|---|---|
| Identifier of Baidu music playing application | Preset identifier 1 |
| Identifier of KuGou music playing application | Preset identifier 2 |
| Identifier of QQ music playing application | Preset identifier 3 |

In this embodiment of the present invention, in step 240, the terminal sends the control message carrying the preset identifier and the control indication information in a broadcasting manner. The control message carries the preset identifier used to identify the to-be-controlled multimedia playing application. Therefore, for the to-be-controlled multimedia playing application, after receiving the control message, the to-be-controlled multimedia playing application may learn that the control message is used to control the to-be-controlled multimedia playing application, and then the to-be-controlled multimedia playing application parses and executes the control indication information. However, for another multimedia playing application, because the another multimedia playing application does not match the preset identifier in the control message, the another multimedia playing application does not execute the control indication information in the control message. Therefore, for a terminal in which multiple multimedia playing applications are installed, a to-be-controlled multimedia playing application may be clearly controlled in the control message sending manner in this embodiment, and no error operation is caused.

Further, to improve user experience, in this embodiment of the present invention, when the multimedia playing application executes a corresponding operation or after the multimedia playing application executes a corresponding operation, that is, when step 250 is performed or after step 250 is performed, the method may further include step 260. Certainly, step 260 is not a necessary execution process.

Step 260: The terminal receives a feedback message sent by the multimedia playing application, where the feedback message is used to show a result of execution of the control indication information by the multimedia playing application.

In this embodiment of the present invention, when the multimedia playing application sends the feedback message in step 260, optionally, the multimedia playing application may send the feedback message in a manner of invoking a setResult( ) function.

Certainly, the foregoing is merely a specific implementation manner for sending the feedback message by the terminal. During actual application, the present invention is not limited to the foregoing implementation manner, and there may be multiple implementation manners, which are not described in detail herein.

Further, in this embodiment of the present invention, after the terminal performs step 260, that is, after the terminal receives the feedback message sent by the multimedia playing application, the method may further include step 270.

Step 270: The terminal displays the feedback message in a text form, a voice form, or a vibration form on the terminal; or the terminal sends the feedback message to an external device, so that the external device displays the feedback message in a text form, a voice form, or a vibration form on the external device.

That is, the feedback message may be fed back to the terminal, or may be fed back to the external device connected to the terminal. For example, when the external device is a Bluetooth earphone, the feedback message may be fed back to the terminal, or may be fed back to the Bluetooth earphone.

That is, the feedback message may be a voice broadcast, which, for example, is played by using an earphone; or may be a vibration prompt, which, for example, causes a smart watch or a smart bracelet to vibrate; or may be displayed in a text form, for example, a text is displayed on a screen of the terminal or displayed on a smart watch; and certainly, may be displayed in an email form.

For example, when the control indication information is "downloading a currently played multimedia file", after the audio playing application is downloaded completely, a prompt of "download completed" in a voice form is played, or a text of "download completed" is displayed in the terminal, or the terminal vibrates to prompt that the download is completed.

As can be seen from the foregoing process, conversion from physical indication information into control indication information is executed by a terminal, and correspondences between control indication information and physical indication information that are defined by a same terminal are the same. Therefore, when a same type of control is performed on different multimedia playing applications, a user only needs to execute a same physical indication, and does not need to execute different physical indications for different multimedia playing applications. Therefore, disadvantages of poor flexibility and user experience that exist when a multimedia playing application is controlled are resolved.

Figure 3:
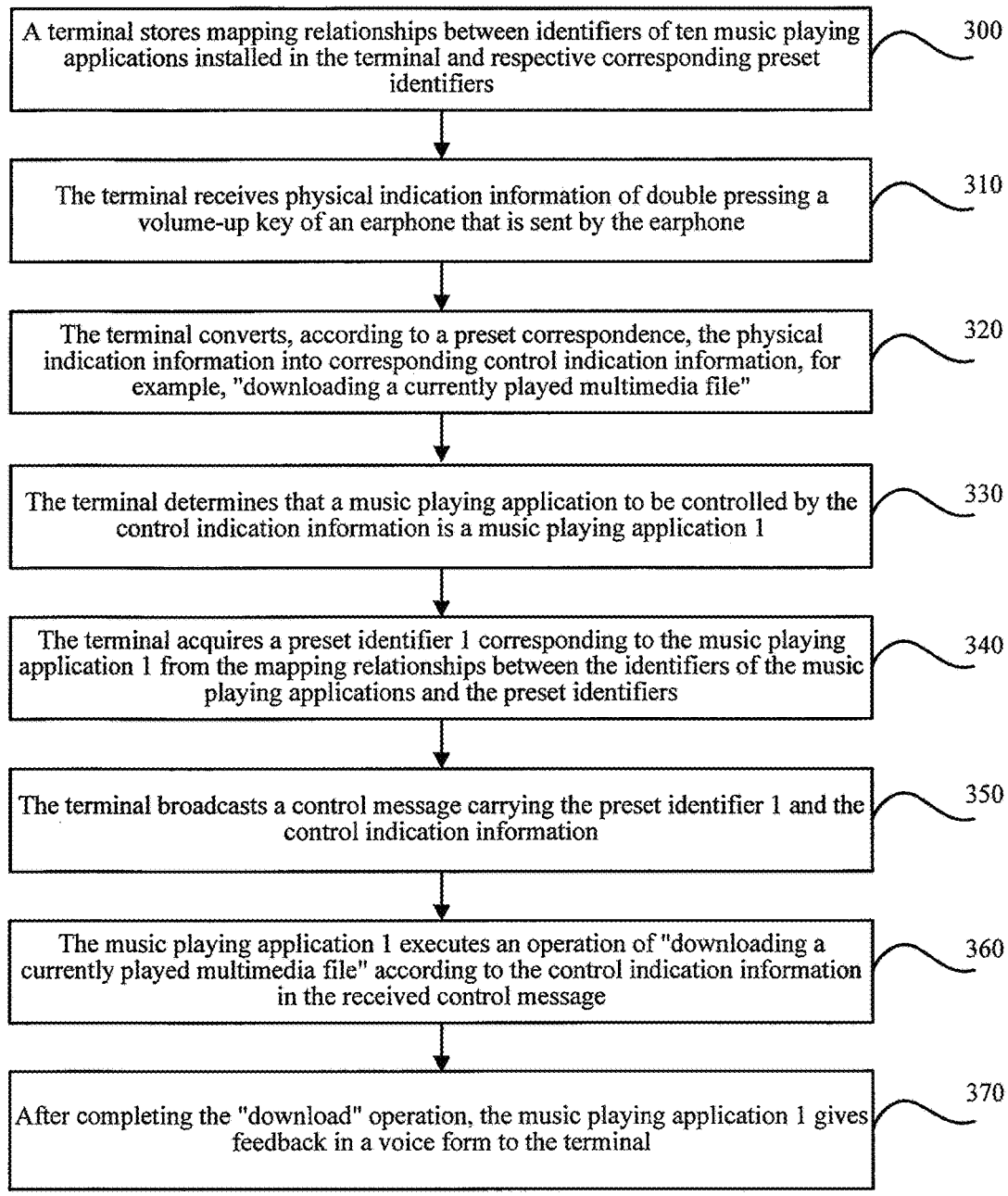
FIG. 3 is a flowchart of another multimedia playing application control method according to an embodiment of the present invention.

To provide a better understanding of the embodiment of the present invention, a specific application scenario is given below to describe in further detail a multimedia playing application control process, as shown in FIG. 3:

Step 300: A terminal stores mapping relationships between identifiers of ten music playing applications installed in the terminal and respective corresponding preset identifiers.

Step 310: The terminal receives physical indication information of double pressing a volume-up key of an earphone that is sent by the earphone.

Step 320: The terminal converts, according to a preset correspondence, the physical indication information into corresponding control indication information, for example, "downloading a currently played multimedia file".

Step 330: The terminal determines that a music playing application to be controlled by the control indication information is a music playing application 1.

Step 340: The terminal acquires a preset identifier 1 corresponding to the music playing application 1 from the mapping relationships between the identifiers of the music playing applications and the preset identifiers.

Step 350: The terminal broadcasts a control message carrying the preset identifier 1 and the control indication information.

Step 360: The music playing application 1 executes an operation of "downloading a currently played multimedia file" according to the control indication information in the received control message.

Step 370: After completing the "download" operation, the music playing application 1 gives feedback in a voice form to the terminal.

Figure 4:
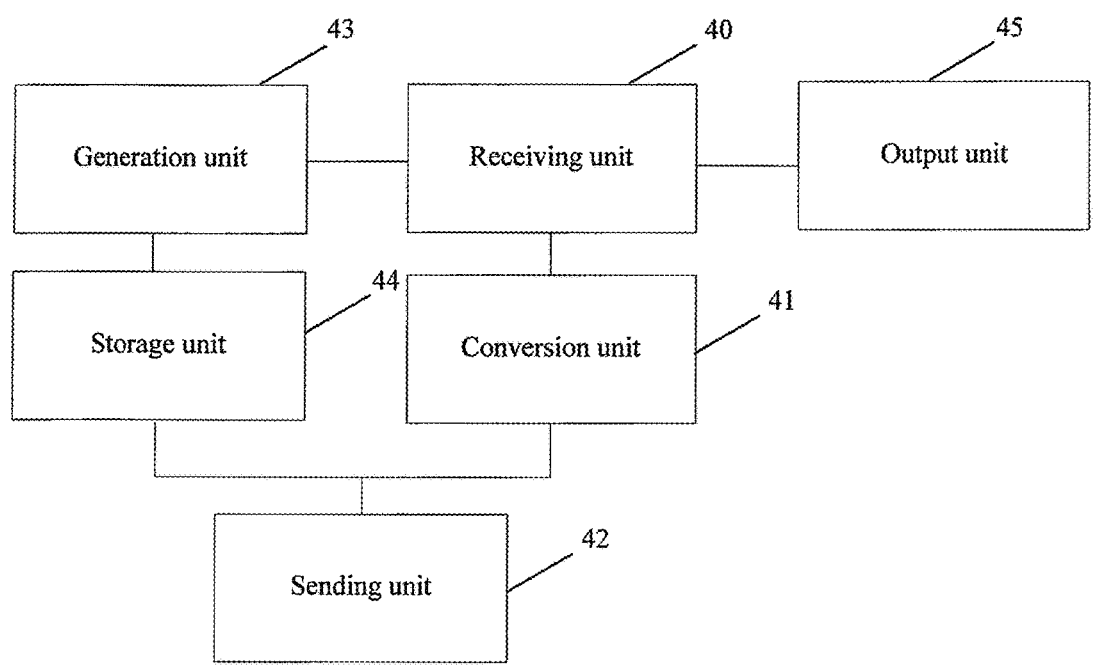
FIG. 4 is a schematic diagram of a terminal according to an embodiment of the present invention.

Based on the foregoing technical solution, referring to FIG. 4, an embodiment of the present invention provides a terminal, and the terminal includes a receiving unit 40, a conversion unit 41, and a sending unit 42.

The receiving unit 40 is configured to receive physical indication information, where the physical indication information is used to control a multimedia playing application running in the terminal.

The conversion unit 41 is configured to convert the physical indication information into corresponding control indication information according to a preset correspondence.

The sending unit 42 is configured to send the control indication information to the multimedia playing application running in the terminal, where the control indication information is used to instruct the multimedia playing application to execute an operation corresponding to the control indication information.

In this embodiment of the present invention, optionally, the receiving unit 40 is specifically configured to:

receive a physical indication sent by an input device located in the terminal; or receive the physical indication information sent by an external device connected to the terminal; or receive voice information from the outside, where the physical indication information is the voice information used to control the multimedia playing application running in the terminal.

In this embodiment of the present invention, optionally, the sending unit 42 is specifically configured to:

determine a multimedia playing application to be controlled by the physical indication information;

acquire a preset identifier corresponding to the to-be-controlled multimedia playing application; and broadcast a control message carrying the preset identifier and the control indication information, so that the to-be-controlled multimedia playing application receives and executes the control indication information.

In this embodiment of the present invention, further, the sending unit 42 is further configured to: before acquiring the preset identifier corresponding to the to-be-controlled multimedia playing application, send a query message to all multimedia playing applications installed in the terminal, where the query message is used to query for a preset value corresponding to each multimedia playing application;

the receiving unit 40 is further configured to receive the corresponding preset values that are separately returned by all the multimedia playing applications according to the query message; and the terminal may further include a generation unit 43 and a storage unit 44, where the generation unit 43 is configured to use the preset values as preset identifiers, or generate preset identifiers according to the preset values; and the storage unit 44 is configured to store mapping relationships between identifiers of the multimedia playing applications and the corresponding preset identifiers.

In this embodiment of the present invention, optionally, when acquiring the preset identifier corresponding to the to-be-controlled multimedia playing application, the sending unit 42 is specifically configured to:

acquire the preset identifier corresponding to the to-be-controlled multimedia playing application from the stored preset identifiers corresponding to the identifiers of the multimedia playing applications.

In this embodiment of the present invention, further, the receiving unit 40 is further configured to:

after the sending unit 42 sends the control indication information to the multimedia playing application running in the terminal, receive a feedback message sent by the multimedia playing application, where the feedback message is used to show a result of execution of the control indication information by the multimedia playing application.

In this embodiment of the present invention, further, the terminal further includes an output unit 45, where the output unit 45 is specifically configured to:

after the receiving unit 40 receives the feedback message sent by the multimedia playing application, display the feedback message in a text form, a voice form, or a vibration form on the terminal; or after the receiving unit 40 receives the feedback message sent by the multimedia playing application, send the feedback message to the external device, so that the external device displays the feedback message in a text form, a voice form, or a vibration form on the external device.

In this embodiment of the present invention, optionally, the preset values received by the sending unit 42 are package names of the multimedia playing applications; and the generating, by the generation unit 43, preset identifiers according to the preset values is specifically:

using the package names of the multimedia playing applications and a preset character string as the preset identifiers.

The terminal provided in this embodiment of the present invention is configured to implement the foregoing method embodiment. For a specific working principle and a working process, refer to the foregoing method embodiment. Details are not described herein again.

Figure 5:
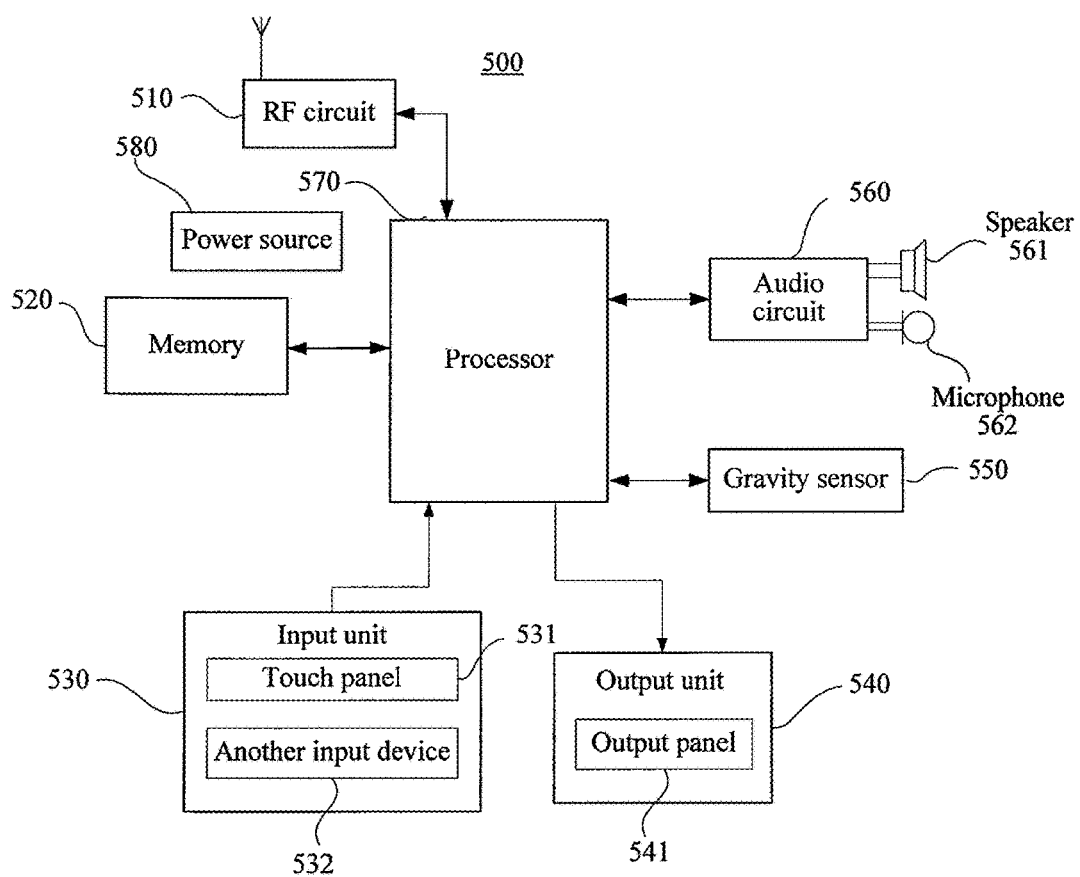
FIG. 5 is a schematic structural diagram of a terminal according to an embodiment of the present invention.

FIG. 5 is a schematic structural diagram of a terminal according to an embodiment of the present invention. The terminal provided in this embodiment of the present invention may be configured to implement the implementation methods in the embodiments of the present invention shown in the foregoing FIG. 1 to FIG. 3. For convenience of description, merely a part related to this embodiment of the present invention is shown. For a specific technical detail that is not disclosed, refer to the embodiments of the present invention shown in FIG. 1 to FIG. 3.

The terminal may be, for example, a mobile phone, a tablet computer, a notebook computer, a UMPC (Ultra-mobile Personal Computer, ultra-mobile personal computer), a notebook, and a PDA (Personal Digital Assistant, personal digital assistant). An example in which the terminal is a mobile phone is used for illustration in this embodiment of the present invention. FIG. 5 is a block diagram of the structure of apart of a mobile phone 500 related to this embodiment of the present invention.

As shown in FIG. 5, the mobile phone 500 includes components such as an RF (radio frequency, radio frequency) circuit 510, a memory 520, an input unit 530, an output unit 540, a gravity sensor 550, an audio circuit 560, a processor 570, and a power source 580. A person skilled in the art may understand that the structure of the mobile phone shown in FIG. 5 does not constitute a limitation on the mobile phone, and the mobile phone may include more components or fewer components than those shown in the figure, or some components may be combined, or a different component deployment may be used.

The following specifically describes the components of the mobile phone 500 with reference to FIG. 5.

The RF circuit 510 may be configured to receive and send signals during an information receiving and sending process or a call process. Particularly, the RF circuit 510 receives downlink information from a base station, then delivers the downlink information to the processor 570 for processing, and sends uplink data to the base station. Usually, the RF circuit includes but is not limited to an antenna, at least one amplifier, a transceiver, a coupler, an LNA (low noise amplifier, low noise amplifier), a duplexer, and the like. In addition, the RF circuit 510 may also communicate with a network and another device by means of wireless communication. The wireless communication may use any telecom standard or protocol, including but not limited to a GSM (global system of mobile communication, Global System for Mobile Communications), a GPRS (general packet radio service, General Packet Radio Service), CDMA (code division multiple access, Code Division Multiple Access), WCDMA (wideband code division multiple access, Wideband Code Division Multiple Access), LTE (long term evolution, Long Term Evolution), an email, an SMS (short messaging service, short messaging service), and the like.

The memory 520 may be configured to store a software program and module. The processor 570 runs the software program and module stored in the memory 520, to implement various functional applications and data processing of the mobile phone 500. The memory 520 may mainly include a program storage area and a data storage area. The program storage area may store an operating system, an application program required by at least one function (such as a sound playing function and an image display function), and the like. The data storage area may store data (such as audio data, image data, and an address book) created according to use of the mobile phone 500, and the like. In addition, the memory 520 may include a high speed random access memory, and may also include a non-volatile memory such as at least one magnetic disk storage device, a flash memory, or another volatile solid-state storage device.

The input unit 530 may be configured to receive input digit or character information, and generate keyboard signal input related to a user setting and function control of the mobile phone 500. Specifically, the input unit 530 may include a touchscreen 531 and another input device 532. The touchscreen 531, also referred to as a touch panel, can collect physical indication information on or near the touchscreen 531 (for example, an operation performed by a user on or near the touchscreen 531 by using any suitable object or accessory such as a finger or a stylus), and drive a corresponding connecting apparatus according to a preset program. Optionally, the touchscreen 531 may include two parts: a touch detection apparatus and a touch controller. The touch detection apparatus detects a touch location of the user, detects physical indication information brought by a touch operation, and transmits the physical indication information to the touch controller. The touch controller receives touch information from the touch detection apparatus, converts the information into touch-point coordinates, then sends the coordinates to the processor 570, and can receive and execute a command sent by the processor 570. In addition, the touchscreen 531 may be a resistive, capacitive, infrared, or surface sound wave type touch panel. In addition to the input unit 531, the input unit 530 may further include the another input device 532. Specifically, the another input device 532 may include but is not limited to one or more of an external earphone, a Bluetooth earphone, a smart watch, a smart bracelet, a physical keyboard, a function key (such as a volume control key and a power on/off key), a trackball, a mouse, and a joystick.

The output unit 540 may be configured to display information entered by a user or information provided for the user and various menus of the mobile phone 500. The output unit 540 may include an output panel 541. Optionally, the output panel 541 may be configured in forms such as an LCD (Liquid Crystal Display, liquid crystal display) and an OLED (Organic Light-Emitting Diode, organic fight-emitting diode). Further, the touchscreen 531 may cover the output panel 541. When detecting a touch operation on or near the touchscreen 531, the touchscreen 531 transmits the touch operation to the processor 570, to determine a type of a touch event, and then the processor 570 provides corresponding visual output on the output panel 541 according to the type of the touch event. Although in FIG. 5, the touchscreen 531 and the output panel 541 implement an input function and an output function of the mobile phone 500 as two independent components, in some embodiments, the touchscreen 531 may be integrated with the output panel 541 to implement the input function and the output function of the mobile phone 500.

The gravity sensor (gravity sensor) 550 may detect magnitude of accelerations of a mobile phone in various directions (generally on three axes), may detect magnitude and a direction of gravity when static, and may be applied to an application that identifies a mobile phone gesture (for example, switching between a horizontal screen and a vertical screen, a related game, and magnetometer gesture calibration), a function related to vibration identification (for example, a pedometer and a knock), and the like.

The mobile phone 500 may further include another sensor, for example, an optical sensor. Specifically, the optical sensor may include an ambient light sensor and a proximity sensor. The ambient light sensor may adjust brightness of the output panel 541 according to brightness of ambient light. The proximity sensor may detect whether there is an object approaching or touching the mobile phone, and may turn off the output panel 541 and/or backlight when the mobile phone 500 is moved to an ear. Another sensor, such as a gyroscope, a barometer, a hygrometer, a thermometer, or an infrared sensor may be configured in the mobile phone 500, which is not described herein again.

The audio circuit 560, a speaker 561, and a microphone 562 may provide an audio interface between a user and the mobile phone 500. The audio circuit 560 may transmit an electrical signal, which is obtained after received audio data is converted, to the speaker 561, and the speaker 561 converts the electrical signal into a sound signal and outputs the sound signal. In this embodiment of the present invention, the audio circuit 560 may transmit an electrical signal, which is obtained after feedback message is converted, to the speaker 561, and the speaker 561 converts the electrical signal into a sound signal and outputs the sound signal. In another aspect, the microphone 562 converts a collected sound signal into an electrical signal, and the audio circuit 560 receives the electrical signal, converts the electrical signal into audio data, and then outputs the audio data to the RF circuit 510, so as to send the audio data to another mobile phone, or outputs the audio data to the memory 540 for further processing.

The processor 570 is a control center of the mobile phone 500, and is connected to various parts of the mobile phone by using various interfaces and lines. By running or executing the software program and/or module stored in the memory 540, and invoking data stored in the memory 540, the processor 540 performs various functions and data processing of the mobile phone 500, thereby performing overall monitoring on the mobile phone. For example, when data stored in the memory 540 is invoked, the following operations are executed:

receiving physical indication information, where the physical indication information is used to control a multimedia playing application running in the terminal;

converting the physical indication information into corresponding control indication information according to a preset correspondence; and sending the control indication information to the multimedia playing application running in the terminal, where the control indication information is used to instruct the multimedia playing application to execute an operation corresponding to the control indication information.

Optionally, the processor 570 may include one or more processing units. Preferably, an application processor and a modem processor may be integrated into the processor 570. The application processor mainly processes an operating system, a user interface, an application program, and the like. The modem processor mainly processes wireless communication. It may be understood that the foregoing modem processor may also not be integrated into the processor 570.

The mobile phone 500 further includes the power supply 580 (such as a battery) for supplying power to the components. Preferably, the power supply may be logically connected to the processor 570 by using a power management system, so as to implement functions such as charging, discharging and power consumption management by using the power management system.

Although not shown, the mobile phone 500 may further include a WiFi (wireless fidelity, wireless fidelity) module, a Bluetooth module, and the like, which is not described in detail herein.

Further, during a process in which the processor 570 receives the physical indication information, the processor 570 is specifically configured to:

receive, by the terminal, a physical indication sent by an input device located in the terminal; or receive, by the terminal, the physical indication information sent by an external device connected to the terminal; or receive, by the terminal, voice information from the outside, where the physical indication information is the voice information used to control the multimedia playing application running in the terminal.

Further, during a process in which the processor 570 sends the control indication information to the multimedia playing application running in the terminal, the processor 570 is specifically configured to:

determine a multimedia playing application to be controlled by the physical indication information;

acquire a preset identifier corresponding to the to-be-controlled multimedia playing application; and broadcast a control message carrying the preset identifier and the control indication information, so that the to-be-controlled multimedia playing application receives and executes the control indication information.

Further, before acquiring the preset identifier corresponding to the to-be-controlled multimedia playing application, the processor 570 is further configured to:

send a query message to all multimedia playing applications installed in the terminal, where the query message is used to query for a preset value corresponding to each multimedia playing application;

receive the corresponding preset values that are separately returned by all the multimedia playing applications according to the query message;

use the preset values as preset identifiers, or generate, by the terminal, preset identifiers according to the preset values; and store the preset identifiers corresponding to the multimedia playing applications.

Further, during a process in which the processor 570 acquires the preset identifier corresponding to the to-be-controlled multimedia playing application, the processor 570 is specifically configured to:

acquire the preset identifier corresponding to the to-be-controlled multimedia playing application from the stored preset identifiers corresponding to the multimedia playing applications.

Further, after sending the control indication information to the multimedia playing application running in the terminal, the processor 570 is further configured to:

receive a feedback message sent by the multimedia playing application, where the feedback message is used to show a result of execution of the control indication information by the multimedia playing application.

Further, after receiving the feedback message sent by the multimedia playing application, the processor 570 is further configured to:

display the feedback message in a text form, a voice form, or a vibration form on the terminal; or send the feedback message to the external device, so that the external device displays the feedback message in a text form, a voice form, or a vibration form on the external device.

In conclusion, in the embodiments of the present invention, conversion from physical indication information into control indication information is executed by a system of a terminal, and correspondences between control indication information and physical indication information that are defined by a same terminal are the same. Therefore, when a same type of control is performed on different multimedia playing applications, only a same physical indication needs to be executed. Therefore, disadvantages of relatively poor flexibility and user experience that exist in a current solution for controlling a multimedia playing application are resolved.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A multimedia playing application control method, comprising:
   receiving, by a terminal, physical indication information, wherein the physical indication information is used to control a multimedia playing application running in the terminal;
   converting, by the terminal, the physical indication information into corresponding control indication information according to a preset correspondence; and
   sending, by the terminal, the control indication information to the multimedia playing application running in the terminal, wherein the control indication information is used to instruct the multimedia playing application to execute an operation corresponding to the control indication information;
   wherein sending, by the terminal, the control indication information to the multimedia playing application running in the terminal comprises:
      determining, by the terminal, a multimedia playing application to be controlled by the physical indication information,
      acquiring, by the terminal, a preset identifier corresponding to the to-be-controlled multimedia playing application, and
   broadcasting, by the terminal, a control message carrying the preset identifier and the control indication information, so that the to-be-controlled multimedia playing application receives and executes the control indication information; and
      wherein before acquiring, by the terminal, a preset identifier corresponding to the to-be-controlled multimedia playing application, the method further comprises:
         sending, by the terminal, a query message to all multimedia playing applications installed in the terminal, wherein the query message is used to query for a preset value corresponding to each multimedia playing application,
      receiving, by the terminal, the corresponding preset values that are separately returned by all the multimedia playing applications according to the query message,
      using, by the terminal, the preset values as preset identifiers, or generating, by the terminal, preset identifiers according to the preset values, and
      storing, by the terminal, the preset identifiers corresponding to the multimedia playing applications.

2. The method according to claim 1, wherein acquiring, by the terminal, a preset identifier corresponding to the to-be-controlled multimedia playing application comprises:
   acquiring, by the terminal, the preset identifier corresponding to the to-be-controlled multimedia playing application from the stored preset identifiers corresponding to the multimedia playing applications.

3. The method according to claim 1, wherein:
   the preset values are package names of the multimedia playing applications; and
   generating, by the terminal, preset identifiers according to the preset values comprises:
   using, by the terminal, the package names of the multimedia playing applications and a preset character string as the preset identifiers.

* * * * *